US011645761B2

(12) United States Patent
Patney et al.

(10) Patent No.: US 11,645,761 B2
(45) Date of Patent: May 9, 2023

(54) ADAPTIVE SAMPLING OF IMAGES

(71) Applicant: Meta Platforms Technologies, LLC, Menlo Park, CA (US)

(72) Inventors: Anjul Patney, Kirkland, WA (US); Anton S. Kaplanyan, Redmond, WA (US); Todd Goodall, Mill Valley, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 333 days.

(21) Appl. No.: 16/993,781

(22) Filed: Aug. 14, 2020

(65) Prior Publication Data

US 2022/0051414 A1 Feb. 17, 2022

(51) Int. Cl.
G06T 9/00 (2006.01)
G06T 7/215 (2017.01)
G06T 7/90 (2017.01)
G06N 20/00 (2019.01)
G06F 17/18 (2006.01)
G06T 3/40 (2006.01)

(52) U.S. Cl.
CPC ............. G06T 7/215 (2017.01); G06F 17/18 (2013.01); G06N 20/00 (2019.01); G06T 3/4023 (2013.01); G06T 7/90 (2017.01); G06T 9/002 (2013.01)

(58) Field of Classification Search
CPC ......... G06T 7/215; G06T 7/90; G06T 7/4023; G06T 7/4046; G06T 9/00–02; H04N 19/132
See application file for complete search history.

(56) References Cited

U.S. PATENT DOCUMENTS

| 8,150,197 | B2 | 4/2012 | Hwang et al. | |
|---|---|---|---|---|
| 2005/0243183 | A1* | 11/2005 | Obrador | H04N 5/3456 348/297 |
| 2010/0232691 | A1* | 9/2010 | Sekiguchi | H04N 19/186 382/166 |
| 2014/0016870 | A1* | 1/2014 | Kim | G06T 3/403 382/199 |
| 2020/0053362 | A1* | 2/2020 | Fu | G06N 3/0454 |
| 2020/0092582 | A1* | 3/2020 | Xiu | H04N 19/597 |
| 2020/0098139 | A1* | 3/2020 | Kaplanyan | G06N 3/0454 |
| 2020/0126191 | A1* | 4/2020 | Munkberg | G06T 7/50 |
| 2020/0126192 | A1* | 4/2020 | Munkberg | G06N 3/08 |

(Continued)

OTHER PUBLICATIONS

Mitchel "Generating Antialiased Images at Low Sampling Densities" Computer Graphics 1987 (Year: 1987).*

(Continued)

*Primary Examiner* — Sean T Motsinger
(74) *Attorney, Agent, or Firm* — Baker Botts L.L.P.

(57) ABSTRACT

In one embodiment, a method includes determining characteristics of one or more areas in an image by analyzing pixels in the image, computing a sampling density for each of the one or more areas in the image based on the characteristics of the one or more areas, generating samples corresponding to the image by sampling pixels in each of the one or more areas according to the associated sampling density, and providing the samples to a machine-learning model as an input, where the machine-learning model is configured to reconstruct the image by processing the samples.

18 Claims, 8 Drawing Sheets

(56) References Cited

U.S. PATENT DOCUMENTS

2020/0145692 A1* 5/2020 Xu .................. H04N 19/174
2022/0051414 A1* 2/2022 Patney .................. G06T 7/90

OTHER PUBLICATIONS

Kuznetsov, et al., Deep Adaptive Sampling for Low Sample Count Rendering, Eurographics Symposium on Rendering, vol. 37 (2018), No. 4, 10 pages.

Hasselgren, et al., Neural Temporal Adaptive Sampling and Denoising, Eurographics 2020, 9 pages.

Farooq U., et al., "A Neural Network Controller for Cartesian Plotter," Eighth International Conference on DigitalInformation Management (ICDIM 2013). IEEE, Sep. 10, 2013, pp. 199-205.

International Search Report and Written Opinion for International Application No. PCT/US2021/044096, dated Nov. 12, 2021, 12 pages.

Marin D., et al., "Efficient Segmentation: Learning Downsampling Near Semantic Boundaries," IEEE/Computer Vision Foundation International Conference on Computer Vision (ICCV), Oct. 2019, 11 Pages.

Sabuncu R.M., et al., "Gradient Based Nonuniform Subsampling for Information—Theoretic Alignment Methods," Proceedings of the 26th Annual International Conference of the IEEE EMBS, Sep. 1-5, 2004, pp. 1683-1686.

Sun W., et al., "Learned Image Downscaling for Upscaling Using Content Adaptive Resampler," IEEE Transactions on Image Processing, vol. 29, Feb. 4, 2020, 14 pages.

Zappella L., et al., "Motion Segmentation: A Review," Artificial Intelligence Research and Development, Proceedings of the 11th International Conference of the Catalan Association for Artificial Intelligence, CCIA 2008, Jul. 3, 2008, 10 pages.

* cited by examiner (c) Uniform samples (b) Adaptive samples (a) Image

ADAPTIVE SAMPLING OF IMAGES

TECHNICAL FIELD

This disclosure generally relates to image processing, and in particular relates to adaptive sampling of images corresponding to a video stream.

BACKGROUND

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

In particular embodiments, a computing device may adaptively adjust sampling density of an area of an image based on characteristics associated with the area. Image rendering pipeline (e.g., using ray tracing, ray casting, or other physics-based computer-graphics techniques) may be computationally expensive. An image may comprise areas that do not contain much information and areas that contain rich information. Adaptively adjusting sampling density of an area based on characteristics associated with the area may significantly reduce the overall computational cost, time, and system resources needed to render the image while allowing the image to be perceived accurately by the users. A computing device may access an image associated with a frame of a video stream. The computing device may determine characteristics of one or more areas in the image by analyzing pixels in the image. The characteristic associated with an area may comprise a determined amount of information within the area. In particular embodiments, the amount of information within the area may be determined based on content in the area. The computing device may compute a sampling density for each of the one or more areas in the image based on the characteristics of the one or more areas. In particular embodiments, to compute the sampling density for the area, the computing device may identify a darkest pixel and a brightest pixel in the area. The computing device may measure a distance between the darkest pixel and the brightest pixel. The computing device may compute the sampling density for the area based on the distance such that a longer distance yields a higher sampling density. In particular embodiments, to compute the sampling density for the area, the computing device may identify a darkest pixel and a brightest pixel in the area. The computing device may measure a brightness difference between the darkest pixel and the brightest pixel. The computing device may compute the sampling density for the area based on the brightness difference such that a larger brightness difference yields a higher sampling density. In particular embodiments, to compute the sampling density for the area, the computing device may calculate a statistical variance of brightness of pixels in the area. The computing device may compute the sampling density for the area based on the calculated statistical variance such that a larger statistical variance yields a higher sampling density. The computing device may generate samples corresponding to the image by sampling pixels in each of the one or more areas according to the associated sampling density. The computing device may provide the samples to a machine-learning model as an input. In particular embodiments, the machine-learning model is configured to reconstruct the image by processing the samples.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
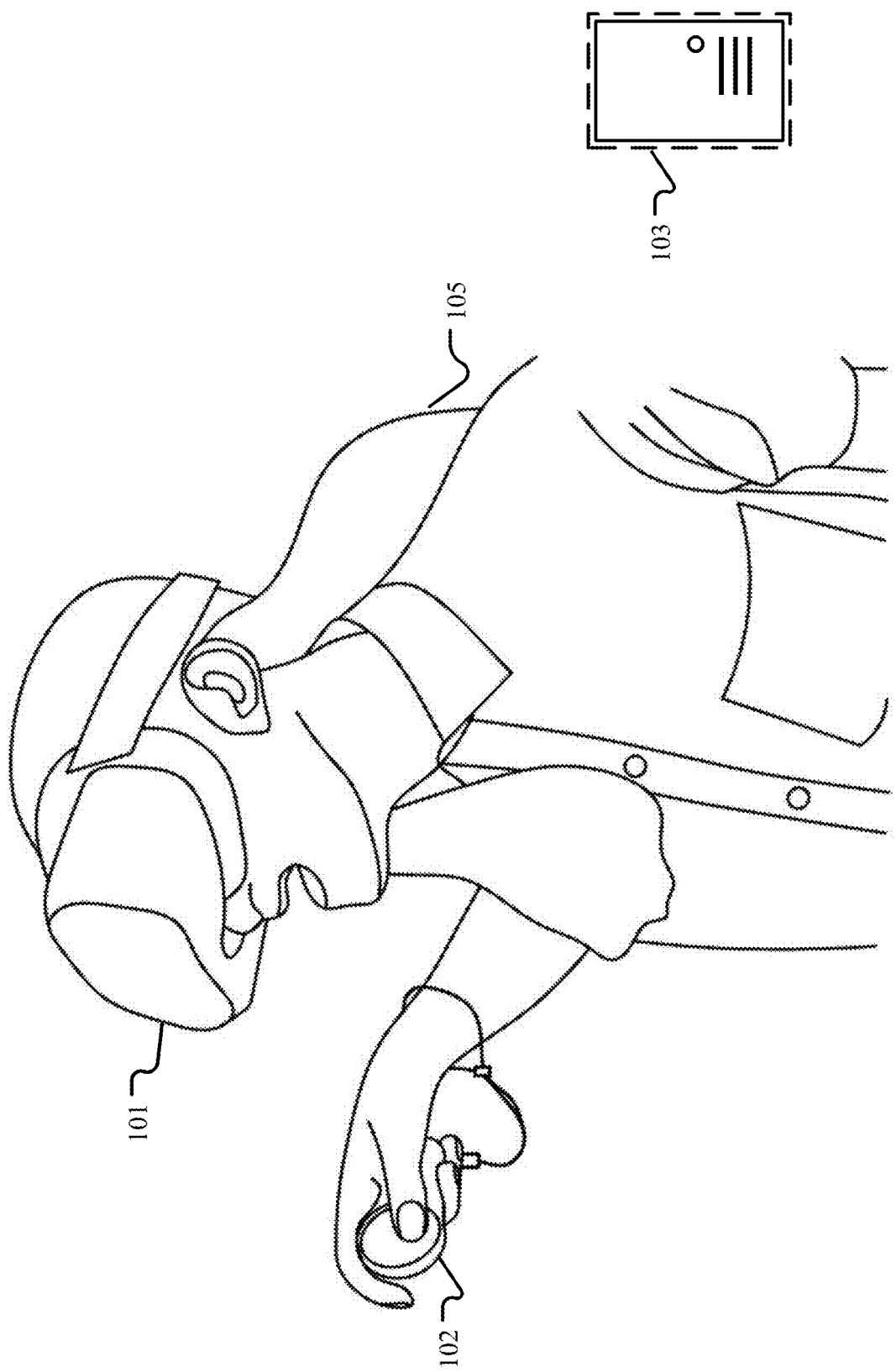
FIG. 1 illustrates an example artificial reality system.

FIG. 1 illustrates an example artificial reality system. Artificial reality is a form of reality that has been adjusted in some manner before presentation to a user 105, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The example artificial reality system illustrated in FIG. 1 may comprise a head-mounted display (HMD) 101, a controller 102, and a computing device 103. A user 105 may wear a head-mounted display (HMD) 101 that may provide visual artificial reality content to the user 105. The HMD 101 may include an audio device that may provide audio artificial reality content to the user 105. A controller 102 may comprise a trackpad and one or more buttons. The controller 102 may receive input from the user 105 and relay the input to the computing device 103. The controller 102 may also provide haptic feedback to the user 105. The computing device 103 may be connected to the HMD 101 and the controller 102. The computing device 103 may control the HMD 101 and the controller 102 to provide the artificial reality content to the user and receive input from the user 105. The computing device 103 may be a standalone host computer system, combined with the HMD 101, a mobile device, or any other hardware platform capable of providing artificial reality content to one or more users 105 and receive input from the users 105.

In particular embodiments, a computing device may adaptively adjust sampling density of an area of an image based on characteristics associated with the area. Image rendering pipeline (e.g., using ray tracing, ray casting, or other physics-based computer-graphics techniques) may be computationally expensive. An image may comprise areas that do not contain much information and areas that contain rich information. Adaptively adjusting sampling density of an area based on characteristics associated with the area may significantly reduce the overall computational cost, time, and system resources needed to render the image while allowing the image to be perceived accurately by the users. A computing device may access an image associated with a frame of a video stream. The computing device may determine characteristics of one or more areas in the image by analyzing pixels in the image. The characteristic associated with an area may comprise a determined amount of information within the area. In particular embodiments, the amount of information within the area may be determined based on content in the area. The computing device may compute a sampling density for each of the one or more areas in the image based on the characteristics of the one or more areas. In particular embodiments, to compute the sampling density for the area, the computing device may identify a darkest pixel and a brightest pixel in the area. The computing device may measure a distance between the darkest pixel and the brightest pixel. The computing device may compute the sampling density for the area based on the distance such that a longer distance yields a higher sampling density. In particular embodiments, to compute the sampling density for the area, the computing device may identify a darkest pixel and a brightest pixel in the area. The computing device may measure a brightness difference between the darkest pixel and the brightest pixel. The computing device may compute the sampling density for the area based on the brightness difference such that a larger brightness difference yields a higher sampling density. In particular embodiments, to compute the sampling density for the area, the computing device may calculate a statistical variance of brightness of pixels in the area. The computing device may compute the sampling density for the area based on the calculated statistical variance such that a larger statistical variance yields a higher sampling density. The computing device may generate samples corresponding to the image by sampling pixels in each of the one or more areas according to the associated sampling density. The computing device may provide the samples to a machine-learning model as an input. In particular embodiments, the machine-learning model is configured to reconstruct the image by processing the samples. Although this disclosure describes adaptively sampling an area of an image based on characteristics associated with the area in a particular manner, this disclosure contemplates adaptively sampling an area of an image based on characteristics associated with the area in any suitable manner.

Figure 2:
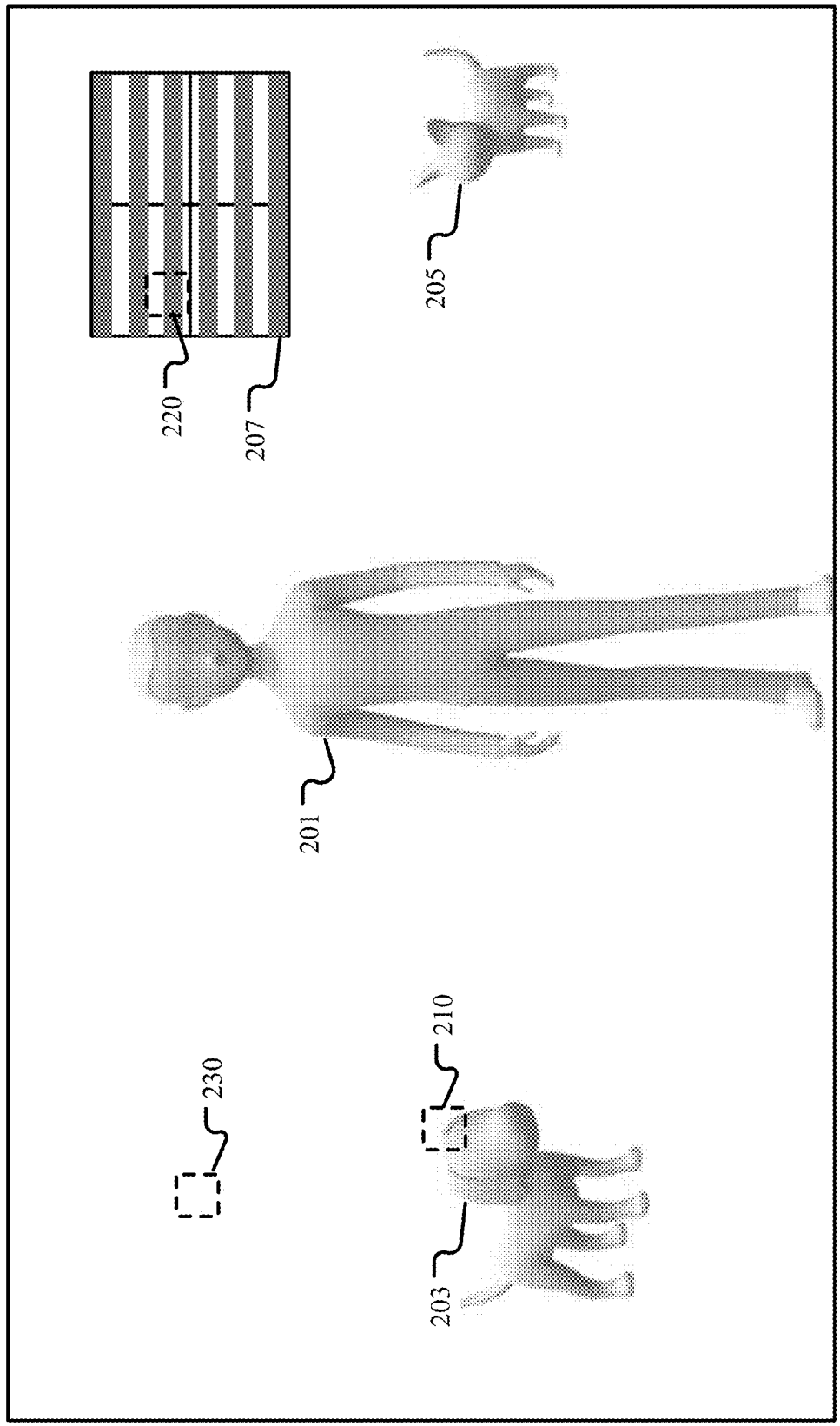
FIG. 2 illustrates an example image for adaptive sampling.

In particular embodiments, the computing device 103 may access an image. In particular embodiments, the image may be associated with a frame of a video stream. FIG. 2 illustrates an example image for adaptive sampling. The example image 200 in FIG. 2 comprises a person 201, a dog 203, and a cat 205 in an indoor place. The indoor place has a window with horizontal blinds 207. The image 200 may be associated with a frame of a video stream. The computing device 103 may access the image 200 that is associated with a frame of a video stream for adaptive sampling. Although this disclosure describes accessing an image for adaptive sampling in a particular manner, this disclosure contemplates accessing an image for adaptive sampling in any suitable manner.

In particular embodiments, the computing device 103 may split the image into one or more areas. In particular embodiments, the computing device 103 may determine characteristics of the one or more areas in the image by analyzing pixels in the image. The computing device may compute a sampling density for each of the one or more areas in the image based on the characteristics of the one or more areas. As an example and not by way of limitation, continuing with a prior example illustrated in FIG. 2, the computing device 103 may split the image 200 into areas. Among the areas, only three areas 210, 220 and 230 are shown in FIG. 2 for a sake of brevity. The area 210 comprises a part of the dog 203. The area 220 comprises a part of the blinded window 207. The area 230 comprises an empty wall. The computing device 103 may compute a sampling density for each area in the image 200 based on characteristics of the area. Although this disclosure describes computing a sampling density for an area of an image based on characteristics associated with the area in a particular manner, this disclosure contemplates computing a sampling density for an area of an image based on characteristics associated with the area in any suitable manner.

In particular embodiments, the characteristic associated with an area may comprise a determined amount of information within the area. In particular embodiments, the amount of information within the area may be determined based on content in the area. In particular embodiments, the computing device 103 may determine an amount of information within an area based on a measured distance between a darkest pixel and a brightest pixel in the area. The computing device 103 may identify the darkest pixel and the brightest pixel in the area. The computing device 103 may measure a distance between the darkest pixel and the brightest pixel in the area. The computing device 103 may compute a sampling density for the area based on the measured distance between the darkest pixel and the brightest pixel in the area such that a longer distance yields a higher sampling density. As an example and not by way of limitation, continuing with a prior example illustrated in FIG. 2, the computing device 103 may identify a darkest pixel and a brightest pixel in area 210. The darkest pixel and the brightest pixel may be separated by an edge in area 210. The computing device 103 may measure a distance between the darkest pixel and the brightest pixel. The computing device 103 may compute the sampling density for area 210 based on the measured distance. As another example and not by way of limitation, the computing device 103 may identify a darkest pixel and a brightest pixel in area 220. The darkest pixel may belong to a shaded part of the window 207 and the brightest pixel may belong to a non-shaded part of the window 207. The computing device 103 may measure a distance between the darkest pixel and the brightest pixel in area 220. In the example illustrated in FIG. 2, the measured distance for area 220 is larger than the measured distance for area 210. Thus, the sampling density for area 220 computed by the computing device 103 may be higher than the sampling density for area 210 computed by the computing device 103. As yet another example and not by way of limitation, the computing device 103 may identify a darkest pixel and a brightest pixel in area 230. The computing device 103 may measure a distance between the darkest pixel and the brightest pixel in area 230. The computing device 103 compute a sampling density for area 230 based on the measured distance. In the example illustrated in FIG. 2, the measured distance for area 230 is smaller than the measured distance for area 210. Thus, the computed sampling density for area 230 is lower than the computed sampling density for area 210. Although this disclosure describes computing a sampling density for an area based on a measured distance between a darkest pixel and a brightest pixel in the area in a particular manner, this disclosure contemplates computing a sampling density for an area based on any suitable characteristic.

In particular embodiments, the characteristic associated with an area may comprise a determined amount of information within the area. In particular embodiments, the amount of information within the area may be determined based on content in the area. In particular embodiments, the computing device 103 may determine an amount of information within an area based on a measured brightness difference between the darkest pixel and the brightest pixel within the area. The computing device 103 may identify a darkest pixel and a brightest pixel in the area. The computing device 103 may measure a brightness difference between the darkest pixel and the brightest pixel. The computing device 103 may compute the sampling density for the area based on the brightness difference such that a larger brightness difference yields a higher sampling density. As an example and not by way of limitation, illustrated in FIG. 2, the computing device 103 may identify a darkest pixel and a brightest pixel in area 210. The darkest pixel and the brightest pixel may be separated by an edge in area 210. The computing device 103 may measure a brightness difference between the darkest pixel and the brightest pixel in area 210. The computing device 103 may compute a sampling density for area 210 based on the measured brightness difference. As another example and not by way of limitation, the computing device 103 may identify a darkest pixel and a brightest pixel in area 220. The darkest pixel may belong to a shaded part of the window 207 and the brightest pixel may belong to a non-shaded part of the window 207. The computing device 103 may measure a brightness difference between the darkest pixel and the brightest pixel in area 220. The computing device 103 may compute a sampling density for area 220 based on the measured brightness difference. In the example illustrated in FIG. 2, the measure brightness difference for area 220 may be greater than the measured brightness difference for area 210. Thus, the computed sampling density for area 220 is higher than the computed sampling density for area 210. As yet another example and not by way of limitation, the computing device 103 may identify a darkest pixel and a brightest pixel in area 230. The computing device 103 may measure a brightness difference between the darkest pixel and the brightest pixel in area 230. As area 230 belongs to an empty wall, the brightness difference may not be significant. The computing device 103 may compute a sampling density for area 230 based on the measured brightness difference. In the example illustrated in FIG. 2, the measure brightness difference for area 230 may be smaller than the measured brightness difference for area 210. Thus, the computed sampling density for area 230 is lower than the computed sampling density for area 210. Although this disclosure describes computing a sampling density for an area based on a measured brightness difference between a darkest pixel and a brightest pixel in the area in a particular manner, this disclosure contemplates computing a sampling density for an area based on a measured brightness difference between a darkest pixel and a brightest pixel in the area in any suitable manner.

In particular embodiments, the characteristic associated with an area may comprise a determined amount of information within the area. In particular embodiments, the amount of information within the area may be determined based on content in the area. In particular embodiments, the computing device 103 may determine an amount of information within an area based on a calculated statistical variance of pixel brightness in the area. The computing device 103 may calculate a statistical variance of brightness of pixels in the area. The computing device 103 may compute a sampling density for the area based on the calculated statistical variance such that a larger statistical variance yields a higher sampling density. As an example and not by way of limitation, illustrated in FIG. 2, the computing device 103 may calculate a statistical variance of pixel brightness in area 210. The computing device 103 may compute a sampling density for area 210 based on the calculated statistical variance of pixel brightness in area 210. As another example and not by way of limitation, the computing device 103 may calculate a statistical variance of pixel brightness in area 220. The computing device 103 may compute a sampling density for area 220 based on the calculated statistical variance of pixel brightness in area 220. In the example illustrated in FIG. 2, the calculated statistical variance of pixel brightness in area 220 may be greater than the calculated statistical variance of pixel brightness in area 210. Thus, the computed sampling density for area 220 may be higher than the computed sampling density for area 210. As yet another example and not by way of limitation, the computing device 103 may calculate a statistical variance of pixel brightness in area 230. The computing device 103 may compute a sampling density for area 230 based on the calculated statistical variance of pixel brightness in area 230. In the example illustrated in FIG. 2, the calculated statistical variance of pixel brightness in area 230 may be smaller than the calculated statistical variance of pixel brightness in area 210. Thus, the computed sampling density for area 230 may be lower than the computed sampling density for area 210. Although this disclosure describes computing a sampling density for an area based on a calculated statistical variance of pixel brightness in the area in a particular manner, this disclosure contemplates computing a sampling density for an area based on a calculated statistical variance of pixel brightness in the area in any suitable manner.

Figure 3:
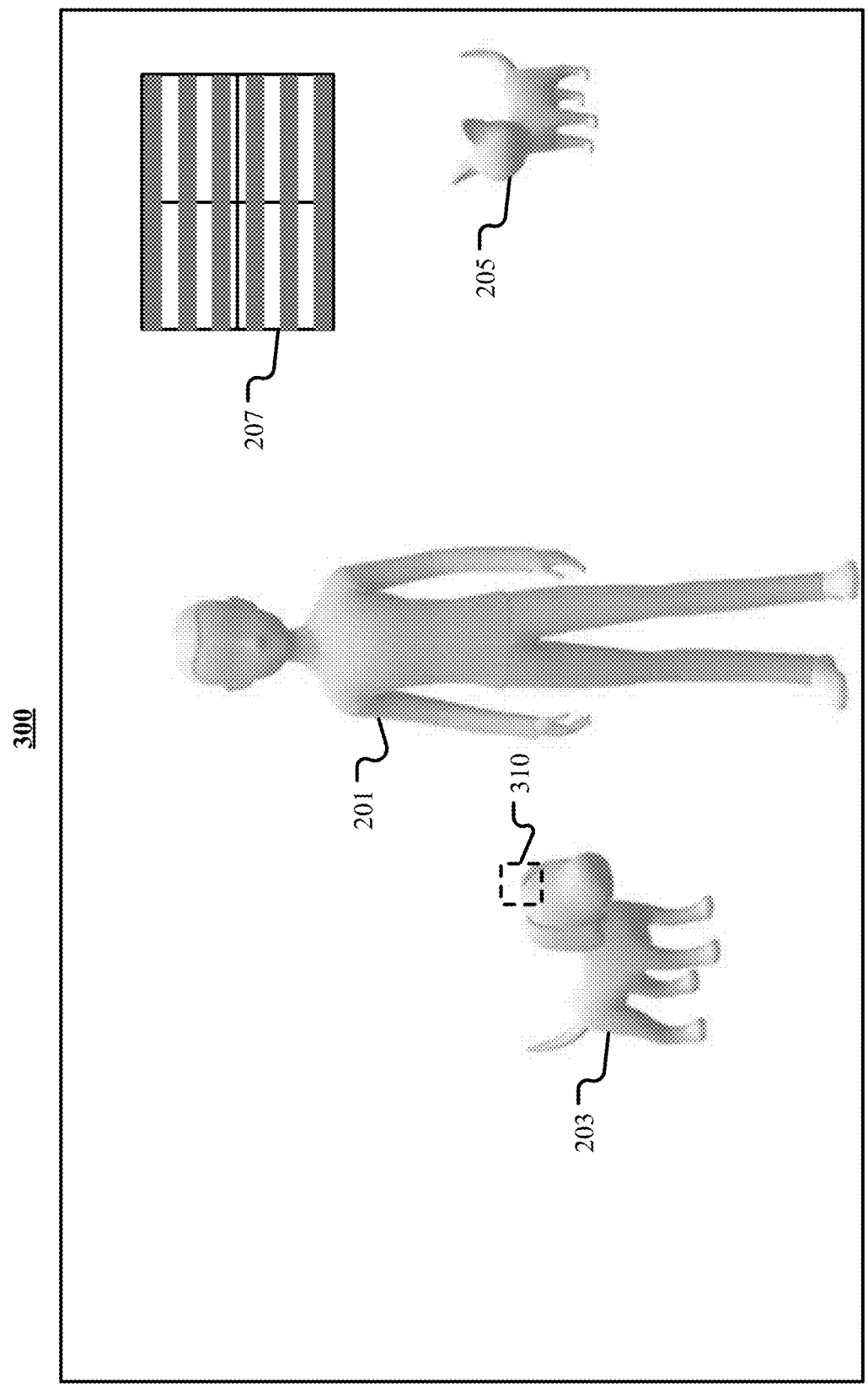
FIG. 3 illustrates an example predicted image corresponding to a current frame of a video stream based on the images corresponding to the previous frames.

In particular embodiments, the characteristic associated with an area may comprise a determined amount of information within the area. In particular embodiments, the amount of information within the area may be determined based on images corresponding to previous frames of the video stream. The computing device 103 may generate a predicted image corresponding to the current frame of the video stream based on the images corresponding to the previous frames of the video stream. FIG. 3 illustrates an example predicted image corresponding to a current frame of a video stream based on the images corresponding to the previous frames. As an example and not by way of limitation, illustrated in FIG. 3, continuing with a prior example, the dog 203 in the scene may be moving toward the person 201. The computing device 103 may generate a predicted image 300 corresponding to the current frame based on previous frames in the video stream. In the predicted image 300, the dog 203 may locate a bit closer to the person 201 than in an image corresponding to a previous frame as the dog have been moving to the person 201 in the previous frames of the video stream. The computing device 103 may compute a sampling density for area 310 based on content of area 310 in the predicted image 300. In particular embodiments, the computing device 103 may compute the sampling density for area 310 based on a measured distance between a darkest pixel and a brightest pixel in area 310 within the predicted image 300. In particular embodiments, the computing device 103 may compute the sampling density for area 310 based on a measured brightness difference between a darkest pixel and a brightest pixel in area 310 within the predicted image 300. In particular embodiments, the computing device 103 may compute the sampling density for area 310 based on a calculated statistical variance of pixel brightness in area 310 within the predicted image 300. Although this disclosure describes computing a sampling density for an area based on content of the area in a predicted image in a particular manner, this disclosure contemplates computing a sampling density for an area based on content of the area in a predicted image in any suitable manner.

In particular embodiments, the computing device 103 may use an object movement tracking for generating the predicted image corresponding to the current frame of a video stream based on the images corresponding to the previous frames of the video stream. In particular embodiments, the computing device 103 may use an optical flow technique for generating the predicted image corresponding to the current frame of the video stream based on the images corresponding to the previous frames of the video stream. The computing device 103 may determine the predicted amount of information in an area based on the predicted image. The amount of information within the area may depend on objects located within the area of the predicted image. The computing device may compute the sampling density for the area based on the determined amount of information within the area. As an example and not by way of limitation, continuing with a prior example, the computing device 103 may use an optical flow technique for generating the predicted image 300. The computing device 103 may compute a sampling density for area 310 based on content of area 310 in the predicted image 300. Although this disclosure describes generating a predicted image corresponding to a current frame of a video stream in a particular manner, this disclosure contemplates generating a predicted image corresponding to a current frame of a video stream in any suitable manner.

Figure 4:
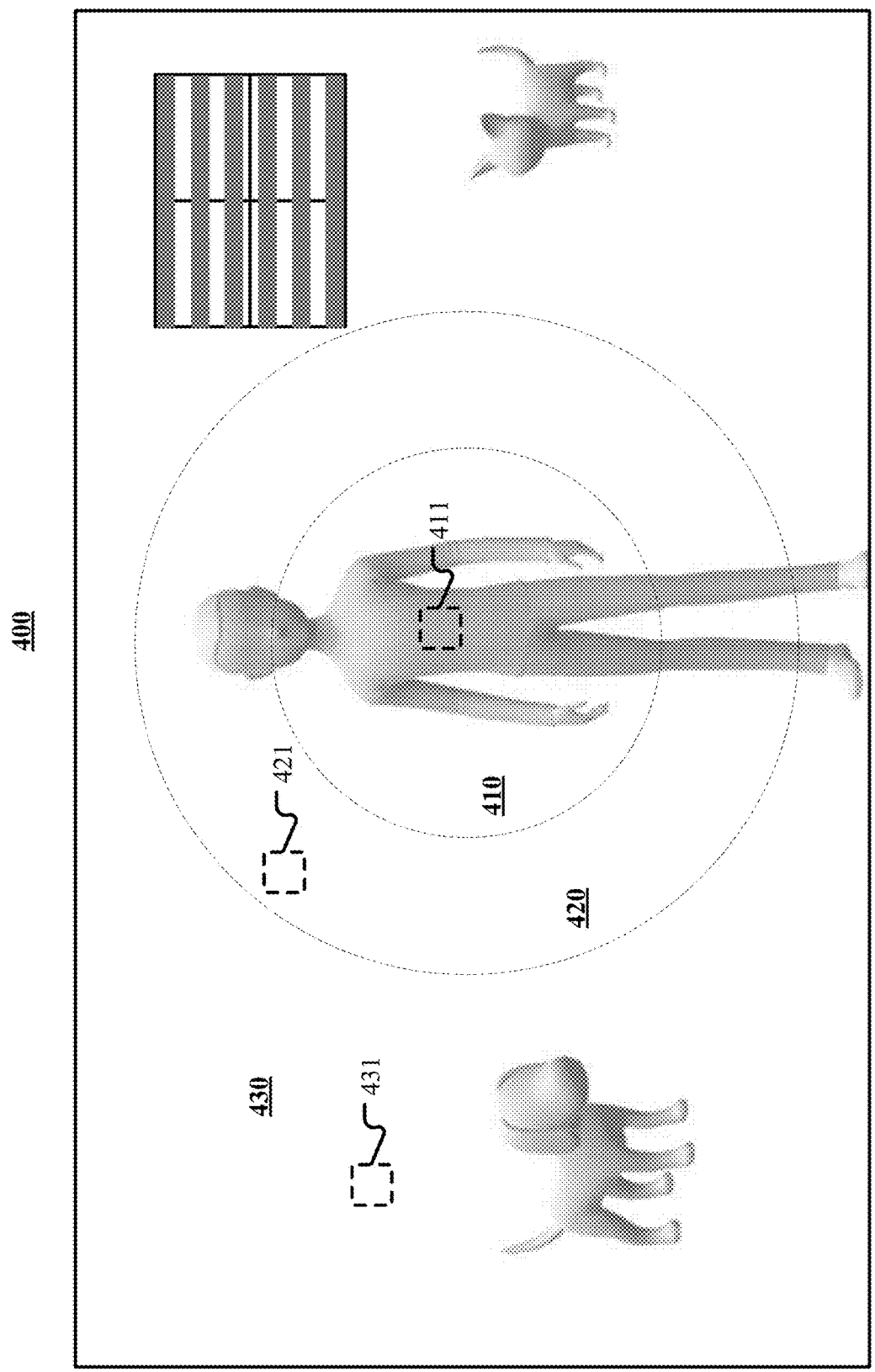
FIG. 4 illustrates an example image for adaptive sampling based on a relative distance of an area from a vergence location of a user.

In particular embodiments, the computing device 103 may compute a sampling density for each of the one or more areas in the image based on the characteristics of the one or more areas. The characteristic associated with an area may comprise a relative distance of the area from a vergence location of a user associated with the video stream. When a first area is closer to the vergence location of the user than a second area, the first sampling density associated with the first area may be higher than a second sampling density associated with the second area. In particular embodiments, an eye tracking technique may be used to determine the relative distance. FIG. 4 illustrates an example image for adaptive sampling based on a relative distance of an area from a vergence location of a user. As an example and not by way of limitation, illustrated in FIG. 4, the computing device 103 may determine a current vergence location of a user in an image 400 using an eye tracking technique while the user is watching the video using the HMD 105. The dotted circles in FIG. 4 are centered at the vergence location of the user. The computing device 103 may assign a high sampling density to an area that is close to the vergence location of the user. A sampling density assigned to an area may become lower as the area becomes farther from the vergence location of the user. For example, the computing device 103 may assign a first sampling density to areas, e.g., area 411, in zone 410. The computing device 103 may assign a second sampling density to areas, e.g., area 421, in zone 420, where the second sampling density is lower than the first sampling density. The computing device 103 may assign a third sampling density to areas, e.g., area 431, in zone 430, where the third sampling density is lower than the second sampling density. Although this disclosure describes computing a sampling density for an area based on a distance of the area from a vergence location of a user in a particular manner, this disclosure contemplates computing a sampling density for an area based on a distance of the area from a vergence location of a user in any suitable manner.

In particular embodiments, the computing device 103 may compute a sampling density for each of the one or more areas in the image based on the characteristics of the one or more areas. The characteristic associated with an area may comprise any suitable combination of sub-characteristics associated with the area. The sub-characteristics associated with an area may include, but not limited to, a measured distance between a darkest pixel and a brightest pixel in the area, a measured brightness difference between the darkest pixel and the brightest pixel within the area, a calculated statistical variance of pixel brightness in the area, a determined amount of information within the area in a predicted image based on the previous frames, and a relative distance of the area from a vergence location of a user. Although this disclosure describes computing a sampling density for an area based on a combination of sub-characteristics associated with the area in a particular manner, this disclosure contemplates computing a sampling density for an area based on a combination of sub-characteristics associated with the area in any suitable manner.

In particular embodiments, the computing device 103 may generate samples corresponding to the image by sampling pixels in each of the one or more areas according to the associated sampling density. As an example and not by way of limitation, continuing with a prior example illustrated in FIG. 2, the computing device 103 may sample pixels in each of the areas 210, 220, and 230 according to the computed sampling densities. The computing device 103 may sample with highest density in area 220, may sample with medium density in area 210, and may sample with lowest density in area 230 among the three areas 210, 220 and 230. Although this disclosure describes sampling pixels in areas according to the associated sampling density in a particular manner, this disclosure contemplates sampling pixels in areas according to the associated sampling density in any suitable manner.

Figure 5:
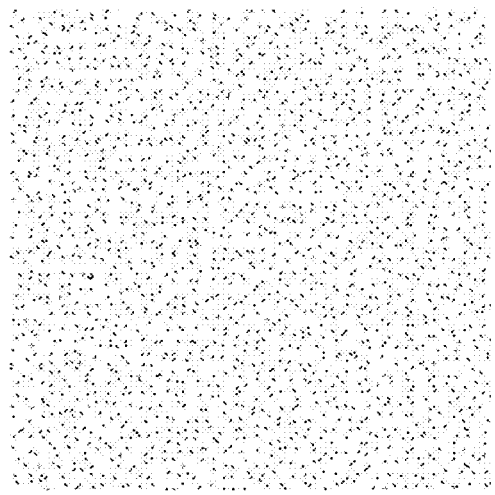
FIG. 5 illustrates an example comparison between adaptive samples and uniform samples.
Figure 5:
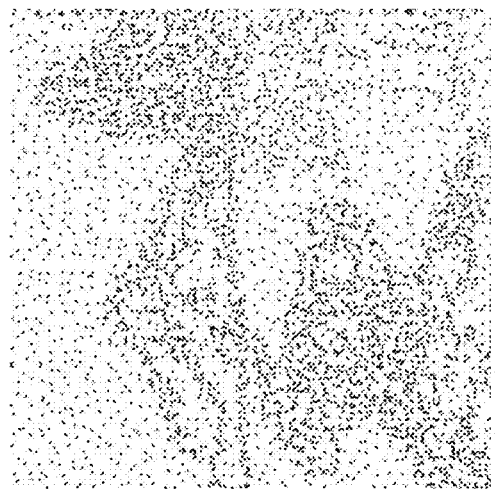
Figure 5:
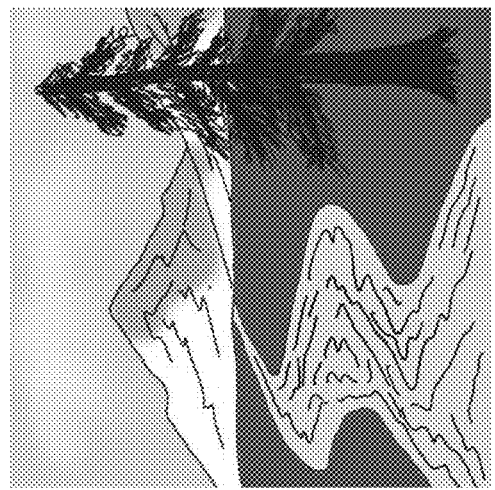

FIG. 5 illustrates an example comparison between adaptive samples and uniform samples. In FIG. 5, (a) shows an image to be rendered. (b) shows samples adaptively taken from the image shown in (a). (c) shows samples uniformly taken from the image shown in (a). The adaptive samples in (b) may be taken based on characteristic associated with each area in the image shown in (a). The characteristic associated with an area may comprise a determined amount of information within the area. In particular embodiments, the amount of information within the area may be determined based on a measured distance between a darkest pixel and a brightest pixel in the area. In particular embodiments, the amount of information within the area may be determined based on a measured brightness difference between the darkest pixel and the brightest pixel in the area. In particular embodiments, the amount of information within the area may be determined based on a calculated statistical variance of brightness of pixels in the area. The adaptive samples in (b) shows that a sampling density for an area with more information, e.g., an area covering the tree, the river, or the mountain, is higher than an area with less information, e.g., an area covering sky, or land. No sampling density difference is observed in the uniform samples in (c).

In particular embodiments, the computing device 103 may provide the samples to a machine-learning model as an input. In particular embodiments, the machine-learning model may be configured to reconstruct the image by processing the samples. In particular embodiments, the machine-learning model may be configured to compress the image. The compressed image may be restored by another machine-learning model before being displayed to the user. In particular embodiments, the machine-learning model may be configured to improve details of the image by enhancing resolutions of the image. In particular embodiments, the machine-learning model may be configured to classify objects in the image. Although this disclosure describes processing an adaptively-sampled image with a machine-learning model in a particular manner, this disclosure contemplates processing an adaptively-sampled image with a machine-learning model in any suitable manner.

Figure 6:
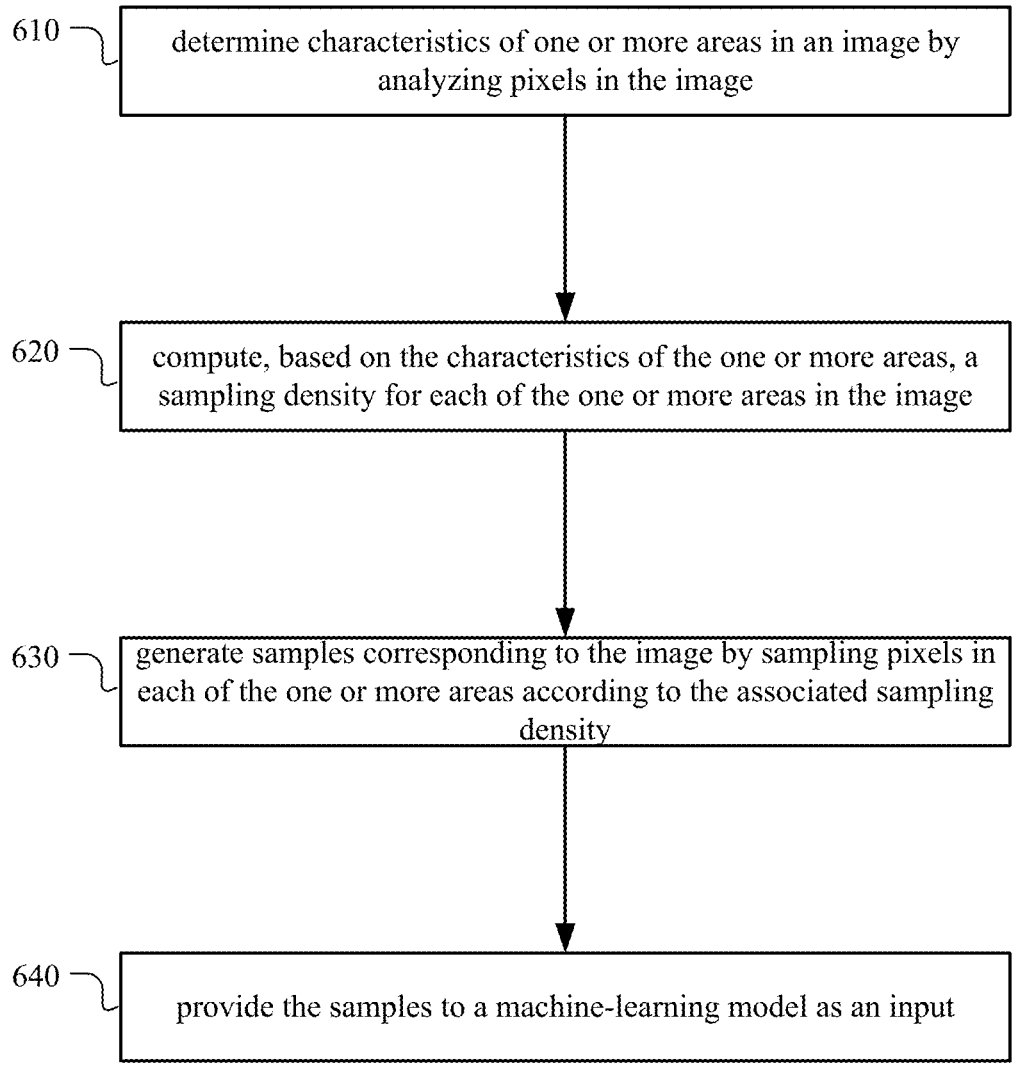
FIG. 6 illustrates an example method for adaptively sampling an image.

FIG. 6 illustrates an example method 600 for adaptively sampling an image. The method may begin at step 610, where the computing device may determine characteristics of one or more areas in an image by analyzing pixels in the image. At step 620, the computing device may compute a sampling density for each of the one or more areas in the image based on the characteristics of the one or more areas. At step 630, the computing device may generate samples corresponding to the image by sampling pixels in each of the one or more areas according to the associated sampling density. At step 640, the computing device may provide the samples to a machine-learning model as an input. The machine-learning model may be configured to reconstruct the image by processing the samples. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for adaptively sampling an image including the particular steps of the method of FIG. 6, this disclosure contemplates any suitable method for adaptively sampling an image including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
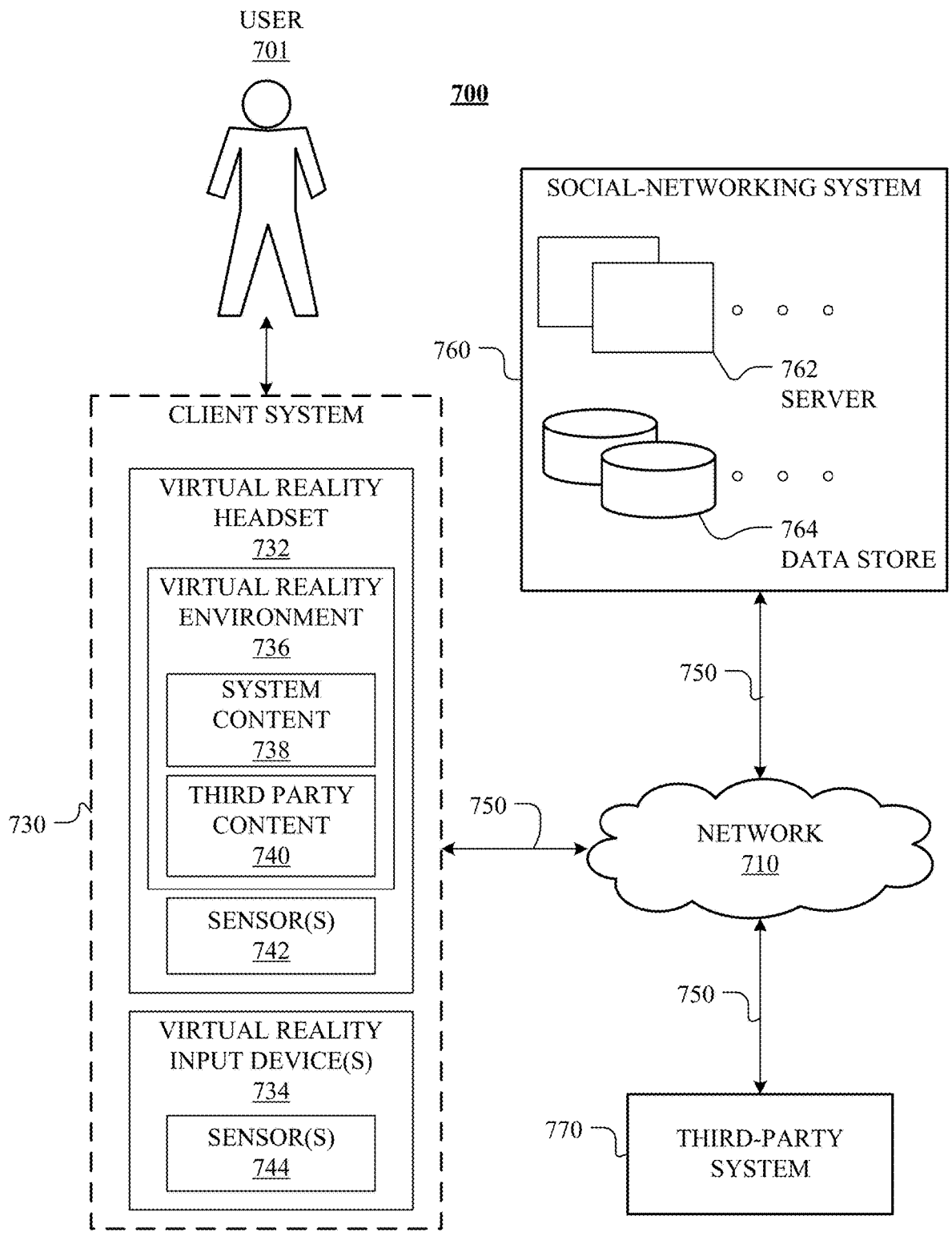
FIG. 7 illustrates an example network environment associated with a virtual reality system.

FIG. 7 illustrates an example network environment 700 associated with a virtual reality system. Network environment 700 includes a user 701 interacting with a client system 730, a social-networking system 760, and a third-party system 770 connected to each other by a network 710. Although FIG. 7 illustrates a particular arrangement of a user 701, a client system 730, a social-networking system 760, a third-party system 770, and a network 710, this disclosure contemplates any suitable arrangement of a user 701, a client system 730, a social-networking system 760, a third-party system 770, and a network 710. As an example and not by way of limitation, two or more of a user 701, a client system 730, a social-networking system 760, and a third-party system 770 may be connected to each other directly, bypassing a network 710. As another example, two or more of a client system 730, a social-networking system 760, and a third-party system 770 may be physically or logically co-located with each other in whole or in part. Moreover, although FIG. 7 illustrates a particular number of users 701, client systems 730, social-networking systems 760, third-party systems 770, and networks 710, this disclosure contemplates any suitable number of client systems 730, social-networking systems 760, third-party systems 770, and networks 710. As an example and not by way of limitation, network environment 700 may include multiple users 701, client systems 730, social-networking systems 760, third-party systems 770, and networks 710.

This disclosure contemplates any suitable network 710. As an example and not by way of limitation, one or more portions of a network 710 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 710 may include one or more networks 710.

Links 750 may connect a client system 730, a social-networking system 760, and a third-party system 770 to a communication network 710 or to each other. This disclosure contemplates any suitable links 750. In particular embodiments, one or more links 750 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 750 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 750, or a combination of two or more such links 750. Links 750 need not necessarily be the same throughout a network environment 700. One or more first links 750 may differ in one or more respects from one or more second links 750.

In particular embodiments, a client system 730 may be an electronic device including hardware, software, or embedded logic components or a combination of two or more such components and capable of carrying out the appropriate functionalities implemented or supported by a client system 730. As an example and not by way of limitation, a client system 730 may include a computer system such as a desktop computer, notebook or laptop computer, netbook, a tablet computer, e-book reader, GPS device, camera, personal digital assistant (PDA), handheld electronic device, cellular telephone, smartphone, virtual reality headset and controllers, other suitable electronic device, or any suitable combination thereof. This disclosure contemplates any suitable client systems 730. A client system 730 may enable a network user at a client system 730 to access a network 710. A client system 730 may enable its user to communicate with other users at other client systems 730. A client system 730 may generate a virtual reality environment for a user to interact with content.

In particular embodiments, a client system 730 may include a virtual reality (or augmented reality) headset 732, such as OCULUS RIFT and the like, and virtual reality input device(s) 734, such as a virtual reality controller. A user at a client system 730 may wear the virtual reality headset 732 and use the virtual reality input device(s) to interact with a virtual reality environment 736 generated by the virtual reality headset 732. Although not shown, a client system 730 may also include a separate processing computer and/or any other component of a virtual reality system. A virtual reality headset 732 may generate a virtual reality environment 736, which may include system content 738 (including but not limited to the operating system), such as software or firmware updates and also include third-party content 740, such as content from applications or dynamically downloaded from the Internet (e.g., web page content). A virtual reality headset 732 may include sensor(s) 742, such as accelerometers, gyroscopes, magnetometers to generate sensor data that tracks the location of the headset device 732. The headset 732 may also include eye trackers for tracking the position of the user's eyes or their viewing directions. The client system may use data from the sensor(s) 742 to determine velocity, orientation, and gravitation forces with respect to the headset. Virtual reality input device(s) 734 may include sensor(s) 744, such as accelerometers, gyroscopes, magnetometers, and touch sensors to generate sensor data that tracks the location of the input device 734 and the positions of the user's fingers. The client system 730 may make use of outside-in tracking, in which a tracking camera (not shown) is placed external to the virtual reality headset 732 and within the line of sight of the virtual reality headset 732. In outside-in tracking, the tracking camera may track the location of the virtual reality headset 732 (e.g., by tracking one or more infrared LED markers on the virtual reality headset 732). Alternatively or additionally, the client system 730 may make use of inside-out tracking, in which a tracking camera (not shown) may be placed on or within the virtual reality headset 732 itself. In inside-out tracking, the tracking camera may capture images around it in the real world and may use the changing perspectives of the real world to determine its own position in space.

Third-party content 740 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 730 may enter a Uniform Resource Locator (URL) or other address directing a web browser to a particular server (such as server 762, or a server associated with a third-party system 770), and the web browser may generate a Hyper Text Transfer Protocol (HTTP) request and communicate the HTTP request to server. The server may accept the HTTP request and communicate to a client system 730 one or more Hyper Text Markup Language (HTML) files responsive to the HTTP request. The client system 730 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 760 may be a network-addressable computing system that can host an online social network. The social-networking system 760 may generate, store, receive, and send social-networking data, such as, for example, user-profile data, concept-profile data, social-graph information, or other suitable data related to the online social network. The social-networking system 760 may be accessed by the other components of network environment 700 either directly or via a network 710. As an example and not by way of limitation, a client system 730 may access the social-networking system 760 using a web browser of a third-party content 740, or a native application associated with the social-networking system 760 (e.g., a mobile social-networking application, a messaging application, another suitable application, or any combination thereof) either directly or via a network 710. In particular embodiments, the social-networking system 760 may include one or more servers 762. Each server 762 may be a unitary server or a distributed server spanning multiple computers or multiple datacenters. Servers 762 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 762 may include hardware, software, or embedded logic components or a combination of two or more such components for carrying out the appropriate functionalities implemented or supported by server 762. In particular embodiments, the social-networking system 760 may include one or more data stores 764. Data stores 764 may be used to store various types of information. In particular embodiments, the information stored in data stores 764 may be organized according to specific data structures. In particular embodiments, each data store 764 may be a relational, columnar, correlation, or other suitable database. Although this disclosure describes or illustrates particular types of databases, this disclosure contemplates any suitable types of databases. Particular embodiments may provide interfaces that enable a client system 730, a social-networking system 760, or a third-party system 770 to manage, retrieve, modify, add, or delete, the information stored in data store 764.

In particular embodiments, the social-networking system 760 may store one or more social graphs in one or more data stores 764. In particular embodiments, a social graph may include multiple nodes—which may include multiple user nodes (each corresponding to a particular user) or multiple concept nodes (each corresponding to a particular concept)—and multiple edges connecting the nodes. The social-networking system 760 may provide users of the online social network the ability to communicate and interact with other users. In particular embodiments, users may join the online social network via the social-networking system 760 and then add connections (e.g., relationships) to a number of other users of the social-networking system 760 whom they want to be connected to. Herein, the term "friend" may refer to any other user of the social-networking system 760 with whom a user has formed a connection, association, or relationship via the social-networking system 760.

In particular embodiments, the social-networking system 760 may provide users with the ability to take actions on various types of items or objects, supported by the social-networking system 760. As an example and not by way of limitation, the items and objects may include groups or social networks to which users of the social-networking system 760 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 760 or by an external system of a third-party system 770, which is separate from the social-networking system 760 and coupled to the social-networking system 760 via a network 710.

In particular embodiments, the social-networking system 760 may be capable of linking a variety of entities. As an example and not by way of limitation, the social-networking system 760 may enable users to interact with each other as well as receive content from third-party systems 770 or other entities, or to allow users to interact with these entities through an application programming interfaces (API) or other communication channels.

In particular embodiments, a third-party system 770 may include one or more types of servers, one or more data stores, one or more interfaces, including but not limited to APIs, one or more web services, one or more content sources, one or more networks, or any other suitable components, e.g., that servers may communicate with. A third-party system 770 may be operated by a different entity from an entity operating the social-networking system 760. In particular embodiments, however, the social-networking system 760 and third-party systems 770 may operate in conjunction with each other to provide social-networking services to users of the social-networking system 760 or third-party systems 770. In this sense, the social-networking system 760 may provide a platform, or backbone, which other systems, such as third-party systems 770, may use to provide social-networking services and functionality to users across the Internet.

In particular embodiments, a third-party system 770 may include a third-party content object provider. A third-party content object provider may include one or more sources of content objects, which may be communicated to a client system 730. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 760 also includes user-generated content objects, which may enhance a user's interactions with the social-networking system 760. User-generated content may include anything a user can add, upload, send, or "post" to the social-networking system 760. As an example and not by way of limitation, a user communicates posts to the social-networking system 760 from a client system 730. Posts may include data such as status updates or other textual data, location information, photos, videos, links, music or other similar data or media. Content may also be added to the social-networking system 760 by a third-party through a "communication channel," such as a newsfeed or stream.

In particular embodiments, the social-networking system 760 may include a variety of servers, sub-systems, programs, modules, logs, and data stores. In particular embodiments, the social-networking system 760 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 760 may also include suitable components such as network interfaces, security mechanisms, load balancers, failover servers, management-and-network-operations consoles, other suitable components, or any suitable combination thereof. In particular embodiments, the social-networking system 760 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 760 to one or more client systems 730 or one or more third-party systems 770 via a network 710. The web server may include a mail server or other messaging functionality for receiving and routing messages between the social-networking system 760 and one or more client systems 730. An API-request server may allow a third-party system 770 to access information from the social-networking system 760 by calling one or more APIs. An action logger may be used to receive communications from a web server about a user's actions on or off the social-networking system 760. In conjunction with the action log, a third-party-content-object log may be maintained of user exposures to third-party-content objects. A notification controller may provide information regarding content objects to a client system 730. Information may be pushed to a client system 730 as notifications, or information may be pulled from a client system 730 responsive to a request received from a client system 730. Authorization servers may be used to enforce one or more privacy settings of the users of the social-networking system 760. A privacy setting of a user determines how particular information associated with a user can be shared. The authorization server may allow users to opt in to or opt out of having their actions logged by the social-networking system 760 or shared with other systems (e.g., a third-party system 770), such as, for example, by setting appropriate privacy settings. Third-party-content-object stores may be used to store content objects received from third parties, such as a third-party system 770. Location stores may be used for storing location information received from client systems 730 associated with users. Advertisement-pricing modules may combine social information, the current time, location information, or other suitable information to provide relevant advertisements, in the form of notifications, to a user.

Figure 8:
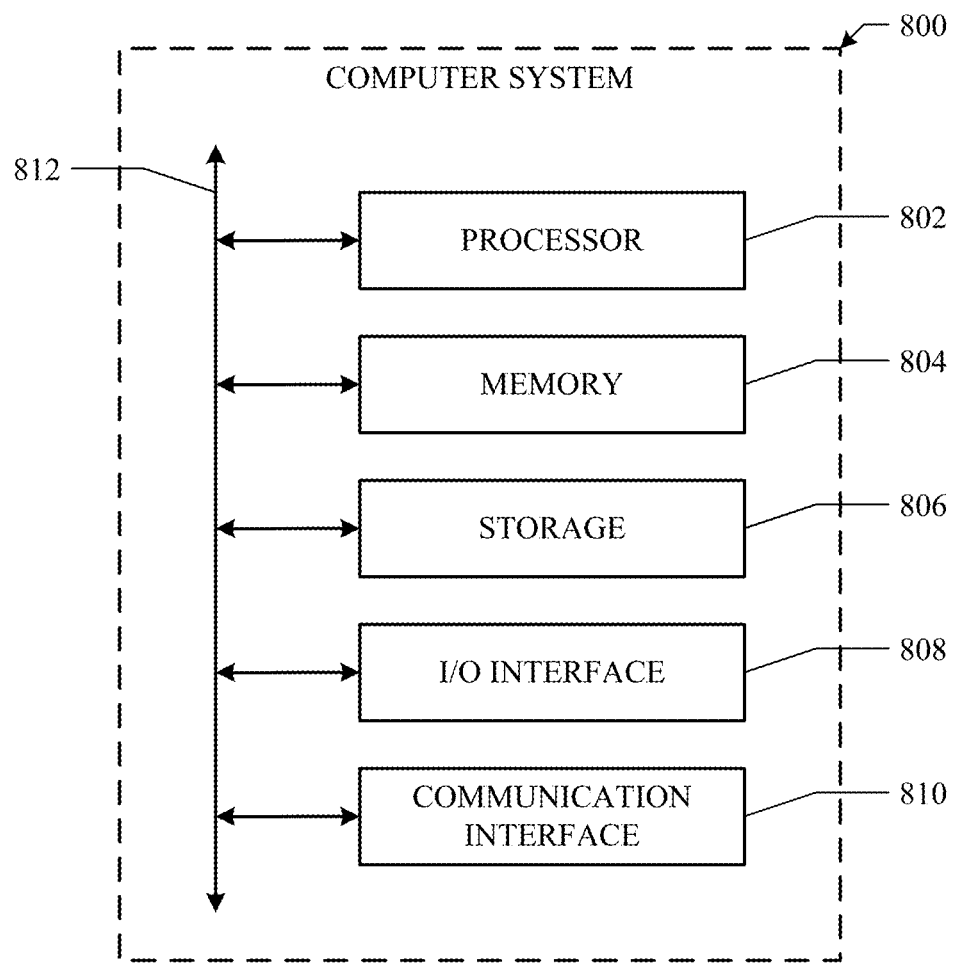
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

MISCELLANEOUS

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing device:
    determining characteristics of one or more areas in an image by analyzing pixels in the image;
    computing, based on the characteristics of the one or more areas, a sampling density for each of the one or more areas in the image, wherein computing the sampling density for the area comprises:
        identifying a darkest pixel and a brightest pixel in the area;
        measuring a distance between the darkest pixel and the brightest pixel; and
        computing the sampling density for the area based on the distance such that a longer distance yields a higher sampling density;
    generating samples corresponding to the image by sampling pixels in each of the one or more areas according to the associated sampling density; and
    providing the samples to a machine-learning model as an input, wherein the machine-learning model is configured to reconstruct the image by processing the samples.

2. The method of claim 1, wherein the characteristic associated with an area comprises a determined amount of information within the area.

3. The method of claim 2, wherein the amount of information within the area is determined based on content in the area.

4. The method of claim 3, wherein computing the sampling density for the area further comprises:
    identifying a darkest pixel and a brightest pixel in the area;
    measuring a brightness difference between the darkest pixel and the brightest pixel; and
    computing the sampling density for the area based on the brightness difference such that a larger brightness difference yields a higher sampling density.

5. The method of claim 3, wherein computing the sampling density for the area further comprises:
    calculating a statistical variance of brightness of pixels in the area; and
    computing the sampling density for the area based on the calculated statistical variance such that a larger statistical variance yields a higher sampling density.

6. The method of claim 2, wherein the image corresponds to a frame of a video stream, and wherein the amount of information within the area is determined based on images corresponding to previous frames of the video stream.

7. The method of claim 6, wherein computing a sampling density for each of the one or more areas in the image further comprises:
    generating a predicted image for the current frame based on the images corresponding to the previous frames of the video stream;
    determining the predicted amount of information within the area based on the predicted image, wherein the amount of information within the area depends on objects located within the area of the predicted image; and
    computing the sampling density for the area based on the determined amount of information within the area.

8. The method of claim 7, wherein an object movement tracking is used for generating the predicted image for the current frame based on the images corresponding to the previous frames of the video stream.

9. The method of claim 7, wherein an optical flow technique is used for generating the predicted image for the current frame based on the images corresponding to the previous frames of the video stream.

10. One or more computer-readable non-transitory storage media embodying software that is operable when executed to:
    determine characteristics of one or more areas in an image by analyzing pixels in the image;
    compute, based on the characteristics of the one or more areas, a sampling density for each of the one or more areas in the image, wherein computing the sampling density for the area comprises:
        identifying a darkest pixel and a brightest pixel in the area;
        measuring a distance between the darkest pixel and the brightest pixel; and
        computing the sampling density for the area based on the distance such that a longer distance yields a higher sampling density;
    generate samples corresponding to the image by sampling pixels in each of the one or more areas according to the associated sampling density; and
    provide the samples to a machine-learning model as an input, wherein the machine-learning model is configured to reconstruct the image by processing the samples.

11. The media of claim 10, wherein the characteristic associated with an area comprises a determined amount of information within the area.

12. The media of claim 11, wherein the amount of information within the area is determined based on content in the area.

13. The media of claim 12, wherein computing the sampling density for the area further comprises:
identifying a darkest pixel and a brightest pixel in the area;
measuring a brightness difference between the darkest pixel and the brightest pixel; and
computing the sampling density for the area based on the brightness difference such that a larger brightness difference yields a higher sampling density.

14. The media of claim 12, wherein computing the sampling density for the area further comprises:
calculating a statistical variance of brightness of pixels in the area; and
computing the sampling density for the area based on the calculated statistical variance such that a larger statistical variance yields a higher sampling density.

15. The media of claim 11, wherein the image corresponds to a frame of a video stream, and wherein the amount of information within the area is determined based on images corresponding to previous frames of the video stream.

16. The media of claim 15, wherein computing a sampling density for each of the one or more areas in the image further comprises:
generating a predicted image for the current frame based on the images corresponding to the previous frames of the video stream;
determining the predicted amount of information within the area based on the predicted image, wherein the amount of information within the area depends on objects located within the area of the predicted image; and
computing the sampling density for the area based on the determined amount of information within the area.

17. The media of claim 16, wherein an object movement tracking is used for generating the predicted image for the current frame based on the images corresponding to the previous frames of the video stream.

18. A system comprising: one or more processors; and a non-transitory memory coupled to the processors comprising instructions executable by the processors, the processors operable when executing the instructions to:
determine characteristics of one or more areas in an image by analyzing pixels in the image;
compute, based on the characteristics of the one or more areas, a sampling density for each of the one or more areas in the image, wherein computing the sampling density for the area comprises:
identifying a darkest pixel and a brightest pixel in the area;
measuring a distance between the darkest pixel and the brightest pixel; and
computing the sampling density for the area based on the distance such that a longer distance yields a higher sampling density;
generate samples corresponding to the image by sampling pixels in each of the one or more areas according to the associated sampling density; and
provide the samples to a machine-learning model as an input, wherein the machine-learning model is configured to reconstruct the image by processing the samples.

* * * * *